United States Patent
Zhou et al.

(10) Patent No.: US 10,334,202 B1
(45) Date of Patent: Jun. 25, 2019

(54) AMBIENT AUDIO GENERATION BASED ON VISUAL INFORMATION

(71) Applicant: Adobe Inc., San Jose, CA (US)

(72) Inventors: Yipin Zhou, Chapel Hill, NC (US);
Zhaowen Wang, San Jose, CA (US);
Chen Fang, Sunnyvale, CA (US);
Trung Huu Bui, San Jose, CA (US)

(73) Assignee: Adobe Inc., San Jose, CA (US)

( * ) Notice: Subject to any disclaimer, the term of this patent is extended or adjusted under 35 U.S.C. 154(b) by 39 days.

(21) Appl. No.: 15/907,497

(22) Filed: Feb. 28, 2018

(51) Int. Cl.
*H04N 5/60* (2006.01)
*G06N 3/04* (2006.01)
*G06N 3/08* (2006.01)

(52) U.S. Cl.
CPC ............... *H04N 5/602* (2013.01); *G06N 3/04* (2013.01); *G06N 3/0445* (2013.01); *G06N 3/0454* (2013.01); *G06N 3/084* (2013.01)

(58) Field of Classification Search
CPC ........ H04N 5/602; G06N 3/04; G06N 3/0445; G06N 3/0454; G06N 3/084
See application file for complete search history.

(56) References Cited

U.S. PATENT DOCUMENTS

2017/0287478 A1* 10/2017 Schulz .................... G10L 15/22
2018/0096632 A1* 4/2018 Florez .................. G09B 21/007

OTHER PUBLICATIONS

Metze, F. et al.; "Improved Audio Features for Large-Scale Multimedia Event Detection"; 2014 IEEE International Conference on Multimedia and Expo (ICME). (Year: 2014).*
Mehri, S. et al., "SampleRNN: An Unconditional End-to-End Neural Audio Generation Model", ICLR 2017, 11 pages.
Van Den Oord, A. et al., "Wavenet: A Generative Model For Raw Audio", arXiv:1609.03499v2, Sep. 19, 2016, 15 pages.
Ephrat, A. And S. Peleg, "Vid2speech: Speech recognition from silent video", ICASSP, 2017, 5 pages.
Owens, A. et al., "Visually indicated sounds", arXiv:1512.08512v2, Apr. 30, 2016, 11 pages.
Chen, L. et al., "Deep cross-modal audio-visual generation", arXiv:1704.08292v1, Apr. 26, 2017, 9 pages.
Gemmeke, J.F. et al., "Audio Set: An Ontology and Human-Labeled Dataset for Audio Events", ICASSP, 2017, 5 pages.
Aytar, Y. et al., "SoundNet: Learning Sound Representations from Unlabeled Video", NIPS 2016, 9 pages.

* cited by examiner

*Primary Examiner* — Michael E Teitelbaum
(74) *Attorney, Agent, or Firm* — Finch & Maloney PLLC

(57) ABSTRACT

Techniques are disclosed for generating audio based on visual information. In some examples, an audio generation system is trained using supervised learning using a training set generated from videos. The trained audio generation system is able to infer audio for provided silent video based on the visual contents of the silent video, and generate raw waveform samples that represent the inferred audio.

20 Claims, 10 Drawing Sheets

AMBIENT AUDIO GENERATION BASED ON VISUAL INFORMATION

FIELD OF THE DISCLOSURE

This disclosure relates generally to audio generation, and more particularly, to ambient audio generation based on visual information.

BACKGROUND

Some sensory modalities include sight, sound, taste, smell, and touch. Of these, sound can be particularly useful in many applications, especially when combined with sight. For example, from social content to official organizational communications, combining sound with vision improves the effectiveness of the communications. For organizations, sound can be particularly useful in enhancing a presentation video that is embedded on the organization's website. For the visually impaired, the combination of sound with visual information allows visually impaired people to experience this information through sound. In a more general sense, a presentation that combines both sound and images can be much more impactful with respect to communication effectiveness, interest, and recollection than a presentation without sound. A very large amount of high quality stock images and videos are available for various uses, including for inclusion in presentations. Adobe Stock is one example source of these stock images and videos. However, the large majority of the available images and videos are without sound. Moreover, there is a lack of easy-to-use applications that allow users to incorporate sound with these images and videos.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
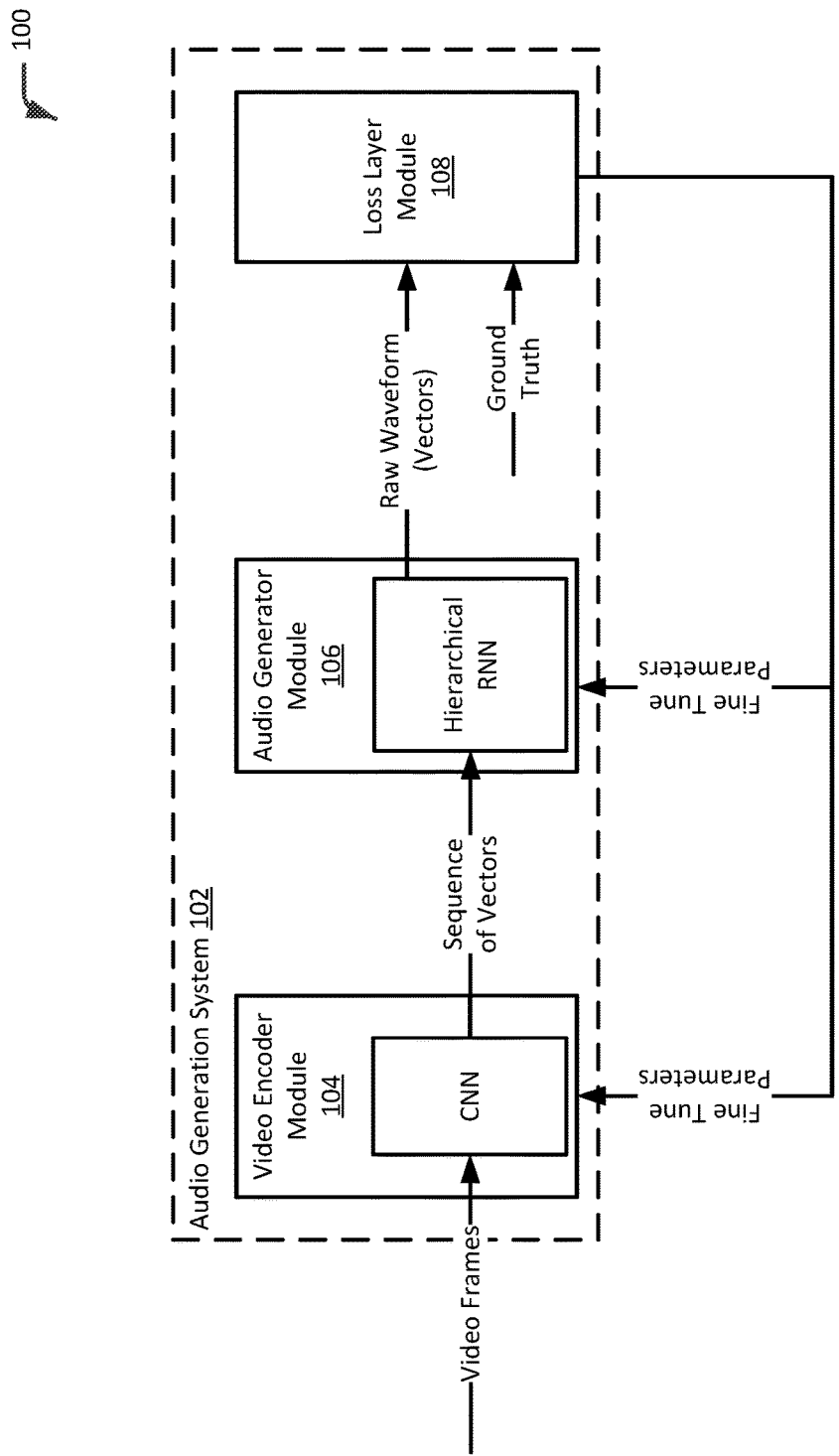
FIG. 1 is a diagram illustrating an example training of an audio generation system implementing a frame-by-frame passing of visual information, in accordance with an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for generating ambient audio based on visual information. As will be appreciated, ambient audio is sound corresponding to the scene represented in the visual information. In one example embodiment, an audio generation system is trained using supervised learning to infer (e.g., predict) ambient audio for a provided silent video, and to generate a raw waveform sample that represents the inferred ambient audio. A "silent" video is generally a video for which there is no corresponding audio component or the corresponding audio component is inaccessible, deficient, corrupted, undesired, unknown, or unavailable. A video is generally a sequence of two or more video frames arranged in a temporally sequential sequence. In a training phase, the audio generation system is specifically trained using a training set generated from so-called generic videos, which are natural videos of varying types of content that includes sound. The training set is comprised of labeled training data, which includes training samples and corresponding ground truths. To generate the training set, a corpus of generic videos, which may include readily available videos and video clips, may be obtained from any commercial or public sources. The audio portion can then be separated or extracted from the generic videos, and the resulting sequences of silent video frames can be used as the training samples and the separated audio waveforms can be used as the corresponding ground truths. Once the audio generation system is trained, it can be used to predict the audio portion of a given input video.

In one embodiment, the audio generation system includes a video encoder module and an audio generator module. The video encoder module receives or otherwise has access to a sequence of video frames (without the audio portion) and is trained to infer the visual contents of the silent video frames, and generate latent representations of the inferred visual contents. The audio generator module receives or otherwise has access to the latent representations of the visual contents inferred by the video encoder module and is trained to infer ambient audio based on the latent representations, and generate raw waveform samples that represent the inferred ambient audio. That is, the audio generator module makes an inference as to the ambient audio that corresponds to the visual contents of the silent video frames as represented by the latent representations, and generates the raw waveform samples that represent the inferred ambient audio. As will be appreciated, the audio generation system is learned end-to-end using training data generated from generic videos, without annotations such as segmentation or category labels, according to some embodiments. Significant advantages can be realized using the techniques provided herein, including the ability to generate a trained audio generation system to directly generate raw waveform samples without any intermediate representations or apriori knowledge of the audio.

During a training phase, the video encoder module and the audio generator module are simultaneously trained using the training set comprised of labeled training data, according to some embodiments. In an example training iteration, a sequence of silent video frames from the training samples is provided to the video encoder module. The video encoder module makes an inference as to the visual contents of a first video frame in the provided sequence, generates a latent representation of the inferred visual contents, and passes the latent representation to the audio generator module. The audio generator module makes an inference as to the ambient audio that corresponds to the visual contents as represented by the received latent representation, and generates a raw waveform sample based on the inferred ambient audio.

During the training phase, a loss layer module receives or is otherwise provided the raw waveform sample generated by the audio generator module. The loss layer module measures the difference between the raw waveform sample and a ground truth corresponding to the first video frame (e.g., the audio portion separated from the first video frame to generate the training set) using a suitable loss function. Based on the measured difference, the loss layer module simultaneously tunes the parameters of the video encoder module and the audio generator module using backpropagation. The video encoder module and the audio generator module can then process a subsequent video frame using the tuned parameters. The subsequent video can be, for instance, a second or later video frame of the same video, or a video frame from another different video having silent video frames. In any such cases, this training or backpropagation iteration can be repeated until the difference between the raw waveform sample generated by the audio generator module and the corresponding ground truth satisfies an accuracy threshold.

Some embodiments of the audio generation system implement a frame-by-frame passing of visual information between the video encoding module and the audio generation module. In some such embodiments, the video encoder module may be provided a sequence of silent video frames along a timeline (e.g., a time sequence associated with the provided sequence of video frames). The video encoder module can then process each video frame of the sequence of video frames, generate a latent representation (e.g., a vector) of the inferred visual contents of each video frame, and pass the latent representations to the audio generator module one latent representation (e.g., one vector) at a time. The audio generation module receives the latent representations, one latent representation at a time, and generates the raw waveform samples one raw waveform sample at a time, where each raw waveform sample is for a corresponding latent representation. Accordingly, in the frame-by-frame passing, the video encoder module passes visual information to the audio generator module one video frame at a time, and the raw waveform sample generated by the audio generator module is for one video frame. That is, the audio generator module generates the raw waveform samples one video frame at a time.

Other embodiments of the audio generation system implement a sequence-by-sequence passing of visual information between the video encoding module and the audio generation module. In some such embodiments, the video encoder module may be provided a sequence of silent video frames, and process the sequence of video frames to generate a sequence of latent representations, where each latent representation is of the inferred visual contents of each video frame of the sequence of video frames. The video encoder module can further encode the sequence of latent representations and generate a last hidden vector. The last hidden vector is a latent representation of the sequence of latent representations along a timeline associated with the sequence of video frames. The video encoder module can pass the last hidden vector to the audio generator module, one latent representation (e.g., one vector) at a time. The audio generation module receives a last hidden vector and generates a raw waveform sample for that last hidden vector. Accordingly, in the sequence-by-sequence passing, the video encoder module passes visual information to the audio generator module one sequence of video frames at a time, and the raw waveform sample generated by the audio generator module is for one sequence of video frames. In a more general sense, the video encoder module can pass a sequence of last hidden vectors, where each last hidden vector is a latent representation for a sequence of video frames, and the audio generator module can generate a sequence of raw waveform samples, where each raw waveform sample is for a sequence of video frames.

In an audio generation phase subsequent to the training phase, the trained audio generation system can be used to infer ambient audio for silent video based on visual information associated with the silent video, and generate a raw waveform sample that represents the inferred ambient audio. The trained audio generation system can implement frame-by-frame passing of visual information or sequence-by-sequence passing of visual information to infer the ambient audio and generate the raw waveform sample representing the inferred ambient audio during the audio generation phase. These and other advantages and alternative embodiments will be apparent in light of this disclosure.

System Architecture

FIG. 1 is a diagram 100 illustrating an example training of an audio generation system 102 implementing a frame-by-frame passing of visual information, in accordance with an embodiment of the present disclosure. As shown in diagram 100, audio generation system 102 includes a video encoder module 104 and an audio generation module 106. During the training phase, video encoder module 104 and audio generation module 106 are simultaneously trained to infer with confidence ambient audio for input silent video, and generate raw waveform samples that represent the inferred ambient audio. Video encoder module 104 and audio generation module 106 are trained end-to-end using labeled training data generated from a corpus of generic videos. The labeled training data includes training samples and corresponding ground truths. For example, the corpus of generic videos may include readily available videos or video clips, which include sound. The generic videos may be obtained from any commercial or public source. The generic videos may be natural videos of varying types of content. To generate the training set, the sound track (e.g., audio) is separated from the video frames of the videos. The separated video frames, which are now silent in that the video frames no longer include audio, comprise the training samples. The sound track waveforms (e.g., audio waveforms separated from the video) corresponding to the silent video frames comprise the ground truths. That is, the audio that is separated from a specific video frame is the ground truth that corresponds to the specific silent video frame. Accordingly, sequences of silent video frames and the corresponding ground truth audio waveforms comprise the labeled training data.

In the training phase, video encoder module 104 receives or is otherwise provided a sequence of silent video frames, makes an inference as to the visual contents of each video frame of the sequence of silent video frames, and generates a sequence of vectors. Each generated vector is a latent representation of the inferred visual contents of a corresponding video frame in the provided sequence of silent video frames. As will be appreciated, the inferences made by video encoder module 104 in the initial stages of the training phase may not be as good or accurate as the inferences made by video encoder module 104 in the later stages of the training phase.

In some embodiments, video encoder module 104 may build a suitable convolutional neural network (CNN) to infer the visual contents of the provided silent video frames, and to generate the latent representations of the inferred visual contents as variously described herein. Examples of suitable CNNs include the Geometry Group (VGG) VGG-19 CNN or any other suitable feed-forward neural network. In some such embodiments, for instance, the sequence of silent video frames (e.g., pixel representations of the video frames in the sequence of silent video frames) is input or otherwise provided to the CNN of video encoder module 104. The CNN makes an inference with respect to the visual contents and the event sequence of the sequence of silent video frames. The CNN can then compute, for each video frame of the sequence of silent video frames, the features that represent the inferred visual contents of the video frame. The computed features can be included in a vector, such as a feature vector, and serve as a latent representation of the inferred visual contents of each corresponding video frame. For example, the vector may be a deep feature representation of the visual contents inferred to correspond to the video frame. The CNN can output a sequence of vectors that corresponds to the provided sequence of silent video frames. In some embodiments, the features may be FC6 features, and the deep feature representation may be an FC6 vector.

In the frame-by-frame passing implementation, the CNN is provided the sequence of silent video frames along a timeline. In one example use case and embodiment, the sequence of silent video frames is sampled at 31.25 frames per second (fps), and the corresponding audio is sampled at 16 kHz (16,000 times per second). Accordingly, a new video frame of the sequence of video frames is provided to the CNN for each 512 samples of the audio. In other embodiments, the sequence of silent video frames may be provided along a different timeline based on suitable sampling rates of the video frames and the corresponding audio. The CNN can then generate a sequence of vectors, where each vector is a latent representation of the inferred visual contents, and pass the sequence of vectors to audio generator module 106 vector by vector in accordance with the timeline. Frame-by-frame passing of the visual information to audio generator module 106 is further described below. In some specific embodiments, the CNN may be a VGG-19 CNN.

Audio generator module 106 receives or is otherwise provided the sequence of vectors from video encoder module 104. For example, in the frame-by-frame passing implementation, audio generator module 106 receives the sequence of vectors from the CNN of audio generator module 106 one vector at a time, where each vector represents the visual contents inferred for a respective video frame in the sequence of silent video frames. Audio generator module 106 makes an inference as to the audio that corresponds to the visual contents of the video frame as represented by the vector. Audio generator module 106 can then generate a raw waveform sample that represents the inferred audio. Similar to video encoder module 104, the inferences of the audio made by audio generator module 106 in the initial stages of the training stage may not be as good or accurate as the inferences made by audio generator module 106 in the later stages of the training phase.

In some embodiments, audio generator module 106 may be implemented using a hierarchical RNN. The hierarchical RNN includes a hierarchy of tiers, where each tier operates at a different temporal resolution. Each tier in the hierarchical RNN includes multiple nodes (or units), and connections between the nodes form a directed cycle. The nodes function as internal memory in that, a node can pass information to its successor node in the directed cycle. This allows the hierarchical RNN to generate audio samples (e.g., raw waveform samples) recurrently, whereby the nodes from the coarser tier, which typically includes multiple audio samples, guides or conditions the audio sample generation by the nodes in the next lower tier (e.g., the tier below the coarser tier). The nodes in the finest (lowest) tier generate individual audio samples, and the nodes in each coarser (higher) tier operate on an increasingly longer timescale and lower temporal resolution. The coarse-to-fine structure of the hierarchical RNN enables the model to generate long sequences (e.g., 100 time steps, 125 time steps, or longer) of audio (e.g., raw waveform samples). The recurrent structure of each tier in the hierarchical RNN allows for the audio sample generation to be conditioned on the previously generated audio sample.

Figure 2:
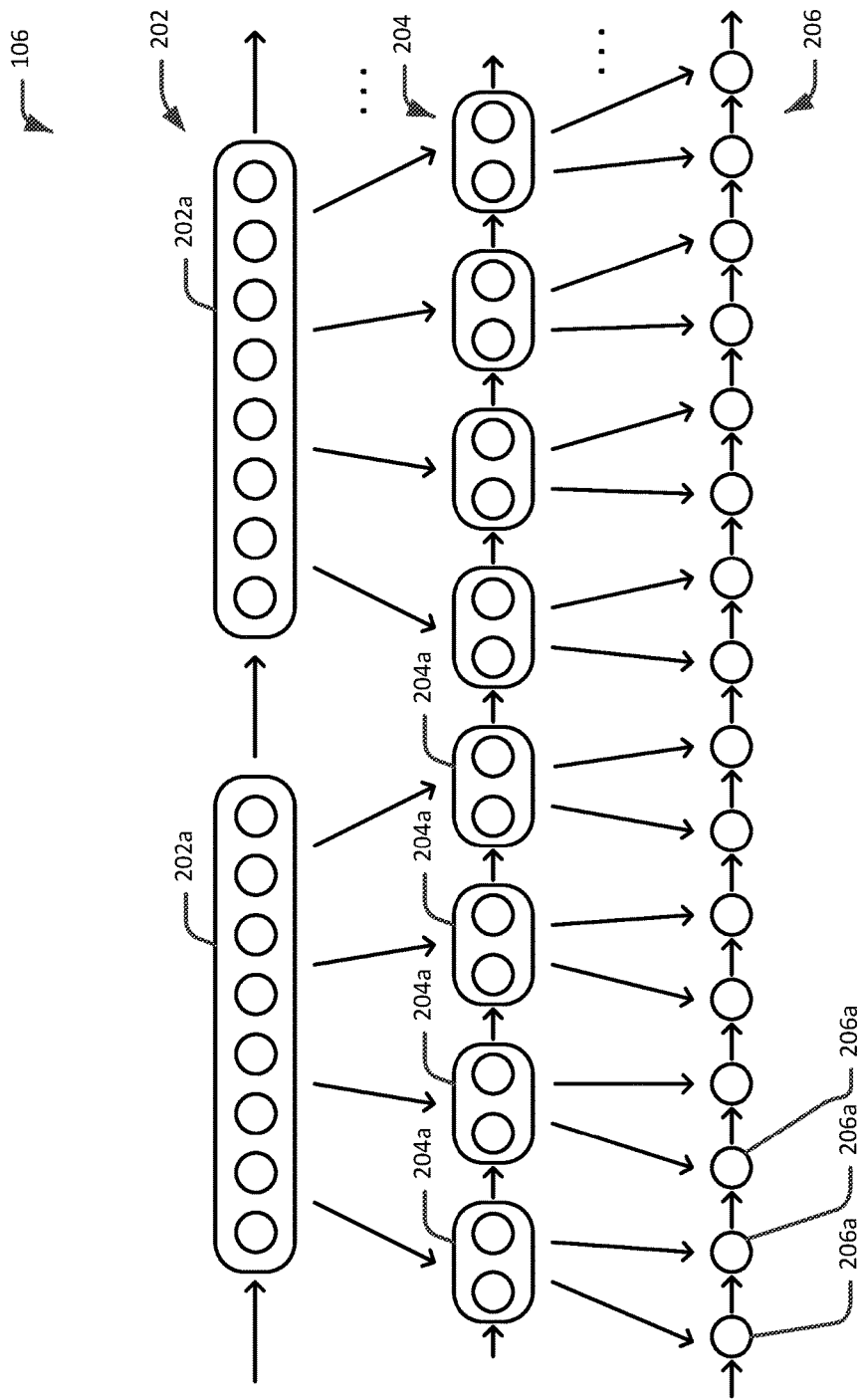
FIG. 2 is a diagram illustrating an example hierarchical recurrent neural network (RNN) structure of an audio generator module, in accordance with an embodiment of the present disclosure.

FIG. 2 is a diagram illustrating an example hierarchical RNN structure of audio generator module 106, in accordance with an embodiment of the present disclosure. As depicted, the hierarchical RNN structure includes three layers, which include a coarsest tier 202, a middle tier 204, and a finest tier 206. The three tiers 202, 204, and 206 comprise the hierarchy of tiers in the hierarchical RNN. Tiers 202, 204, and 206 each operate at different temporal resolutions to recurrently generate the audio samples. In more detail, the lowest tier (finest tier 206) processes individual samples (raw waveform samples), and each higher tier operates on an increasingly longer timescale and a lower temporal resolution. In the illustrated embodiment, each node 202a in tier 202 includes eight samples (represented by circles in FIG. 2), each node 204a in tier 204 includes two samples, and each node 206a in tier 206 represents a single sample. Accordingly, as indicated by the larger number of samples, nodes 204a in tier 204 operate on a longer timescale and lower temporal resolution than nodes 206a in tier 206. Similarly, nodes 202a in tier 202 operate on a longer timescale and lower temporal resolution than nodes 204a in tier 204. In other embodiments, the nodes in the upper tiers of the hierarchical RNN (e.g., tier 202 and/or tier 204) may each include a different number of samples than the numbers illustrated in FIG. 2. For instance, nodes 204a may each include three, four, or other suitable number of samples, and nodes 202a may each include a suitable number of samples larger than the number of samples included in node 204a. In still other embodiments, the hierarchical RNN may include a different number of layers, such as four tiers, five tiers, or any other suitable number of tiers. In any such embodiments, the coarse-to-fine tier structure allows for the generation of long sequences of raw waveform samples.

In some embodiments, the hierarchical RNN utilizes Gated Recurrent Units (GRUs) as the gating mechanism for controlling signals flowing from the coarser recurrent tiers to the finer recurrent tiers (e.g., from tier 202 to tier 204, and from tier 204 to tier 206) in the hierarchical RNN. Generally, GRUs allow the hierarchical RNN to learn (e.g., capture) long-term dependencies, thus preventing the vanishing gradient problem. Given a current input and a previous hidden state, a GRU computes a next hidden state. In some embodiments, the hidden units for all GRUs may be of a suitable size, such as 1024 hidden units. A GRU includes a reset gate that determines how to combine the new input with the previous memory, and an update gate that specifies the amount of the previous memory to maintain. As indicated by the arrows between tiers 202 and 204, and tiers 204 and 206, nodes 202a guide the sample generation by nodes 204a, which in turn guide the sample generation by nodes 206a. Also, as indicated by the arrows between the nodes (e.g., nodes 202a, nodes 204a, and nodes 206a) in tiers 202, 204, and 206, hidden information can be passed between the nodes in the hierarchical RNN. In any such embodiments, the recurrent structure of the tiers allows for the waveform sample generation to be conditioned on the previously generated waveform sample. During the training phase, the hierarchical RNN and, more specifically, tiers 202, 204, and 206 of the hierarchical RNN are trained by backpropagation. In some specific embodiments, audio generator module 106 may be implemented using the SampleRNN, which is an unconditional end-to-end neural audio generation model. In other embodiments, audio generator module 106 may be implemented using other suitable deep learning architectures as will be appreciated in light of this disclosure.

Referring again to FIG. 1, in the training phase, the raw waveform sample generated by audio generator module 106 is input or otherwise provided to a loss layer module 108. In some embodiments, loss layer module 108 may implement backpropagation using a suitable loss function, such as Adam gradient descent. In other embodiments, gradient descent, stochastic gradient descent, or other suitable optimization method may be used. Loss layer module 108 can utilize the loss function to measure the difference between the provided raw waveform sample and the corresponding ground truth. As described previously, in the frame-by-frame passing implementation, the raw waveform sample represents the ambient audio that is inferred to correspond to a single video frame, and the corresponding ground truth is the audio that is separated from the single video frame to generate the training set. In the illustrated embodiment, loss layer module 108 utilizes backpropagation with a learning rate of 0.001 to simultaneously adjust the parameters of video encoder module 104 and audio generator module 106 based on the measured difference. In other embodiments, other suitable learning rates may be employed to simultaneously adjust the parameters of video encoder module 104 and audio generator module 106. In some specific embodiments, loss layer module 108 uses backpropagation to simultaneously update the weights of the layers of the CNN implemented by video encoder module 104 and the weights of the layers (tiers) of the hierarchical RNN implemented by audio generator module 106 based on the measured difference. The backpropagation iterations may be repeated a suitable number of times (e.g., thousands of iterations, tens of thousands of iterations, or even a larger number of iterations) until the parameters of video encoder module 104 and audio generator module 106 are tuned such that the difference between the raw waveform sample generated by audio generator module 106 and the corresponding ground truth satisfies an accuracy threshold.

Figure 3:
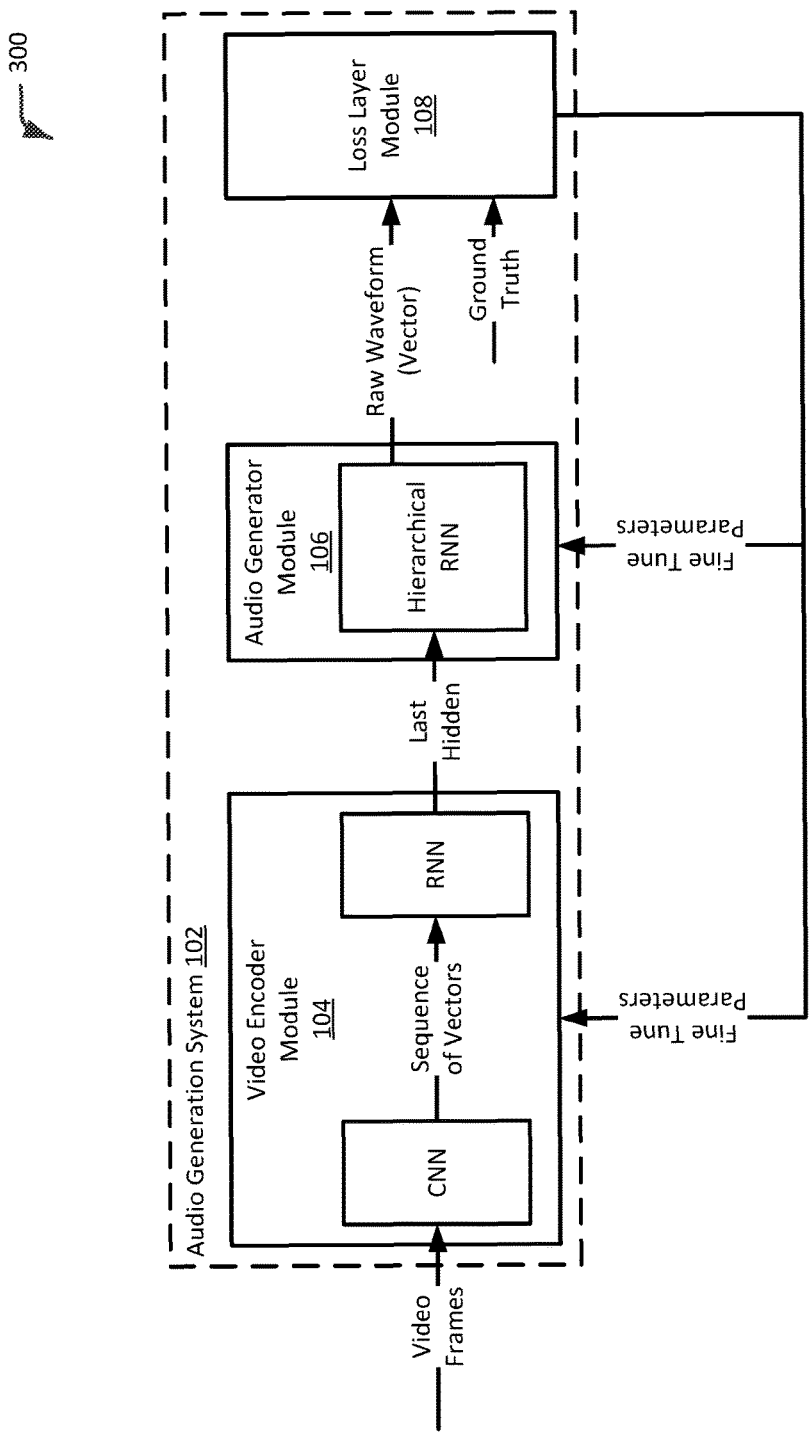
FIG. 3 is a diagram illustrating an example training of the audio generation system implementing a sequence-by-sequence passing of visual information, in accordance with an embodiment of the present disclosure.

FIG. 3 is a diagram 300 illustrating an example training of audio generation system 102 implementing a sequence-by-sequence passing of visual information, in accordance with an embodiment of the present disclosure. Diagram 300 of FIG. 3 is similar to diagram 100 of FIG. 1, with additional details. The previously relevant discussion is equally applicable here. Accordingly, unless context dictates otherwise, those components in diagram 300 that are labelled identically to components of diagram 100 will not be described again for the purposes of clarity.

As shown in diagram 300, in the sequence-by-sequence passing implementation, video encoder module 104 builds and implements an RNN to encode a sequence of vectors (e.g., the latent representations of the inferred visual contents of a sequence of video frames) generated by the CNN. In some such embodiments, for instance, a sequence of FC6 vectors generated by the CNN of video encoder module 104 is input or otherwise provided to the RNN. For example, the sequence of vectors may correspond to a sequence of video frames of a suitable length of time, such as 10 seconds, 15 seconds, 250 video frames, 300 video frames, or any other suitable length of video. The RNN can then encode the provided sequence of FC6 vectors, and generate a last hidden vector, which is a fixed length latent vector that represents the information provided by the sequence of FC6 vectors along a timeline. The RNN can then provide the last hidden vector to audio generator module 106. As will be appreciated in light of this disclosure, the RNN can provide a sequence of last hidden vectors, where each last hidden vector represents information provided by a respective sequence of FC6 vectors, to audio generator module 106. For example, the RNN can encode a sequence of a suitable number of FC6 vectors (e.g., 250 FC6 vectors representing 250 video frames, 300 FC6 vectors representing 300 video frames, or other larger or smaller number including a much larger or much smaller number of FC6 vectors representing a corresponding number of video frames and/or video frames of varying lengths of time) and pass a resulting last hidden vector to audio generator module 106. Video encoder module 104 can then encode another sequence of the same or a different number of FC6 vectors, which may or may not sequentially follow the preceding sequence of FC6 vectors, and pass a resulting last hidden vector to audio generator module 106. Video encoder module 104 can repeat this process any number of times, or until there are no more FC6 vectors to process. Accordingly, in contrast to the frame-by-frame passing where video encoder module 104 passes the visual information to audio generator module 106 one video frame at a time, in the sequence-by-sequence passing implementation, video encoder module 104 passes the visual information to audio generator module 106 a sequence of video frames (e.g., multiple video frames) at a time.

Audio generator module 106 receives the last hidden vector, and makes an inference as to the ambient audio that corresponds to the visual contents of the video frames as represented by the last hidden vector. In some such embodiments, audio generator module 106 generates a raw waveform sample that represents the ambient audio inferred to correspond to the visual contents of the video frames as represented by the last hidden vector. For example, suppose the last hidden vector represented 10 seconds of sequential video frames (e.g., 10 seconds of video). In this instance, audio generator module 106 generates a raw waveform sample that represents 10 seconds of ambient audio inferred by audio generator module 106 to correspond to the 10 seconds of sequential video frames. For example, the hierarchical RNN of audio generator module 106 can recurrently generate the appropriate length of audio, for example, the 10 seconds of ambient audio. Sequence-by-sequence passing of the visual information to audio generator module 106 is further described below.

In the training phase, the raw waveform sample generated by audio generator module 106 is input or otherwise provided to loss layer module 108, which then measures the difference between the provided raw waveform sample and a corresponding ground truth. In this instance, the ground truth is audio that is separated from the sequence of video frames that corresponds to the raw waveform sample to generate the training set. As described previously, the raw waveform sample represents the inferred ambient audio that corresponds to a specific sequence of video frames. The ground truth corresponding to the raw waveform sample in this instance is the audio that is separated from the specific sequence of video frames to generate the training set. Loss layer module 108 utilizes backpropagation with a suitable learning rate, such as 0.001, to simultaneously adjust the parameters of video encoder module 104 (the CNN and the RNN) and audio generator module 106 based on the measured difference.

Figure 4:
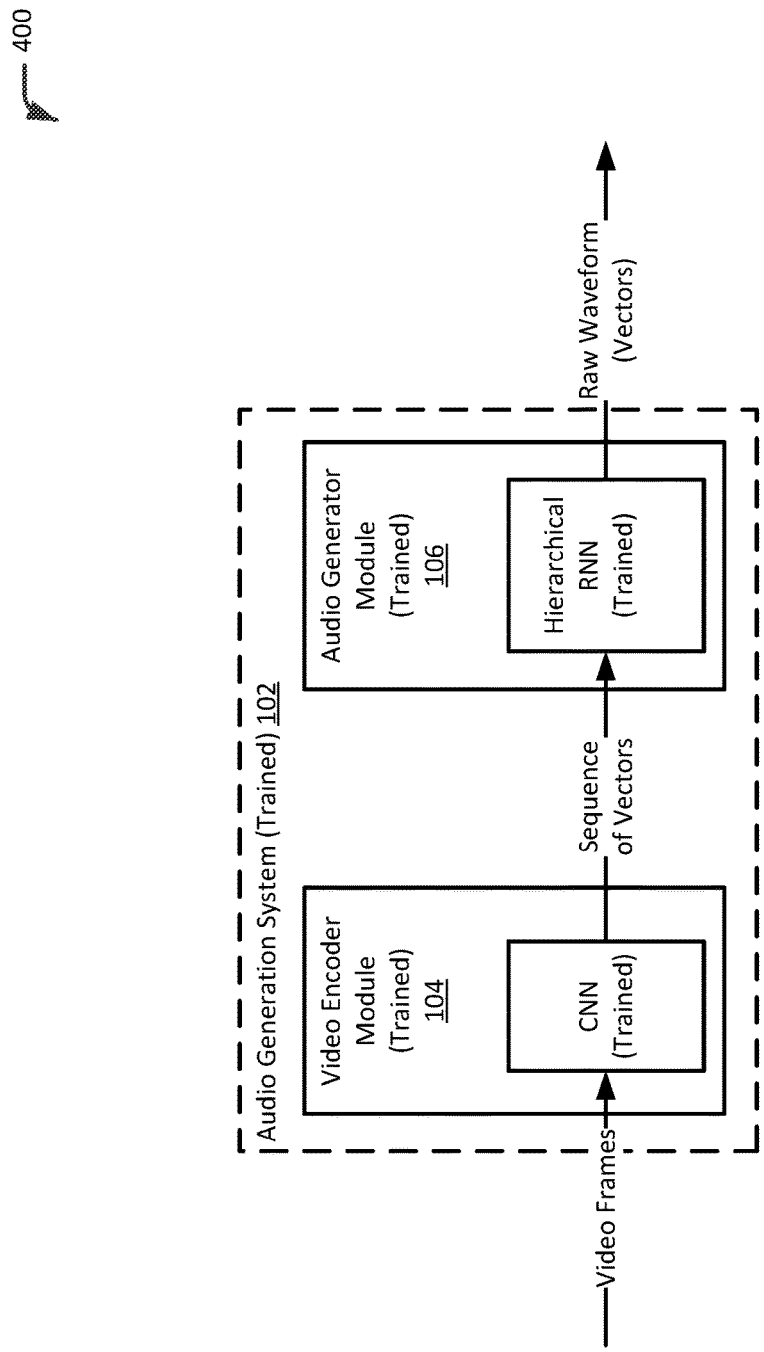
FIG. 4 is a diagram illustrating an example audio generation by a trained audio generation system implementing a frame-by-frame passing of visual information, in accordance with an embodiment of the present disclosure.

FIG. 4 is a diagram 400 illustrating an example ambient audio generation by trained audio generation system 102 implementing a frame-by-frame passing of visual information, in accordance with an embodiment of the present disclosure. As shown in diagram 400, trained audio generation system 102 includes a trained video encoder module 104 and a trained audio generator module 106. As described previously, in various embodiments, video encoder module 104 may be implemented as a CNN, and audio generator module 106 may be implemented as a hierarchical RNN. In such embodiments, the CNN and the hierarchical RNN are simultaneously trained during a training phase, and the trained CNN and the trained hierarchical RNN operate to infer ambient audio for silent video in the audio generation phase.

In one example use case and embodiment of the frame-by-frame passing of the visual information in the audio generation phase, a sequence of video frames of a silent video may be input or otherwise provided to the trained CNN along a timeline associated with the sequence of video frames. For each provided video frame, the trained CNN makes an inference with respect to the visual contents of the video frame, and generates a vector, such as an FC6 vector, which represents the inferred visual contents of the video frame. The trained CNN then provides the generated vector to the trained hierarchical RNN, which makes an inference as to the ambient audio that corresponds to the visual contents of the video frame as represented by the provided vector. The trained hierarchical RNN then generates a raw waveform sample based on the provided vector (e.g., based on the inferred ambient audio). Thus, for a sequence of video frames, the trained CNN generates a corresponding sequence of vectors, one vector at a time, which are provided to the trained hierarchical RNN one vector at a time. As an example, suppose the silent video includes a sequence of 30 video frames. In this instance, the trained CNN receives the sequence of 30 video frames, one video frame at a time, along a timeline. When the trained CNN receives a first video frame, the trained CNN generates a first vector, which is a latent representation of the visual contents of the first video frame, and provides the first vector to the trained hierarchical RNN, which generates a raw waveform sample based on the first vector. When the trained CNN subsequently receives a second video frame, the trained CNN generates a second vector, which is a latent representation of the visual contents of the second video frame, and provides the second vector to the trained hierarchical RNN, which generates a raw waveform sample based on the second vector. In this manner, the trained CNN generates a sequence of 30 vectors, provides each vector to the trained hierarchical RNN upon generating each vector, thus allowing the trained hierarchical RNN to generate the raw waveform sample for each provided vector one vector (e.g., one raw waveform sample) at a time.

Figure 5:
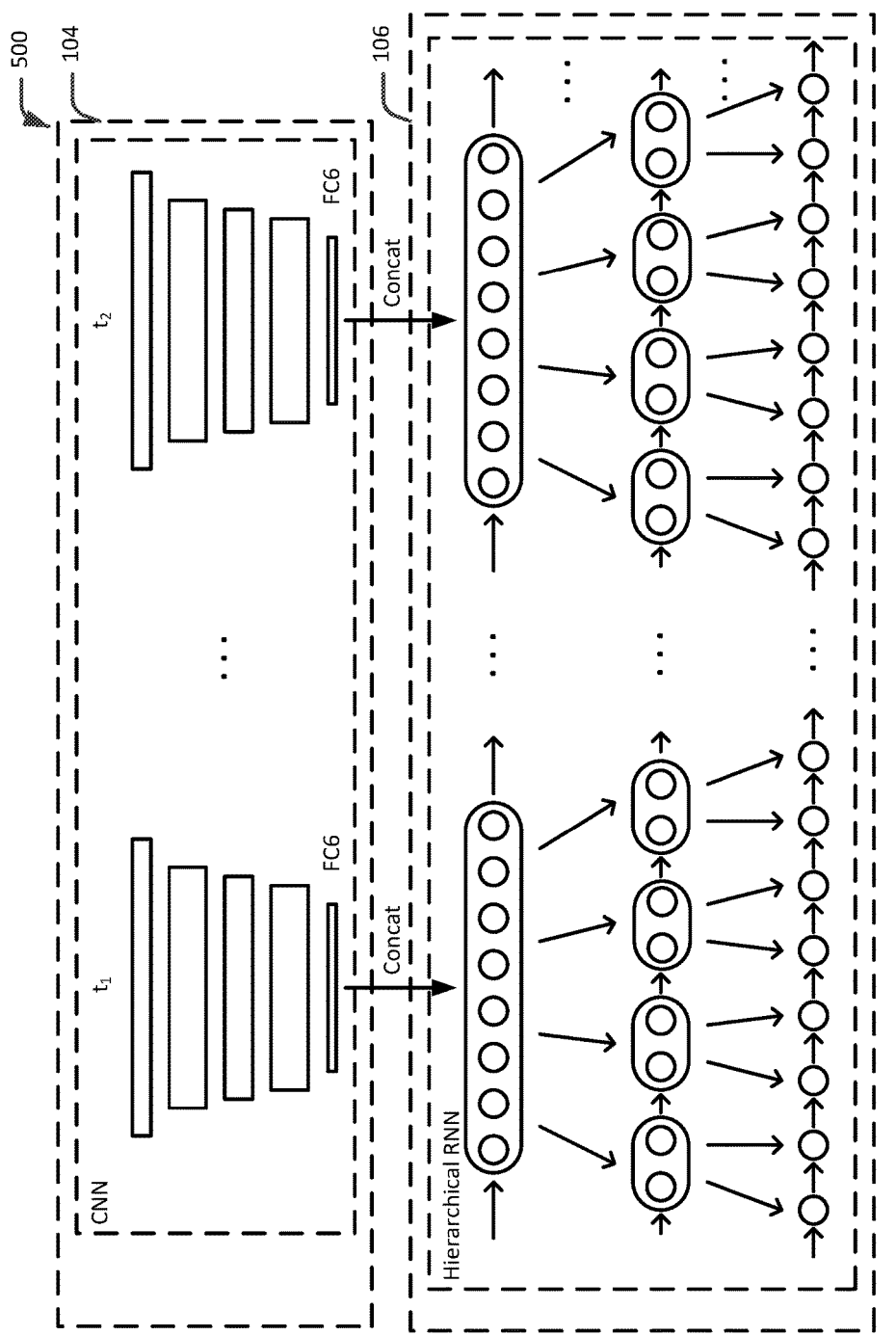
FIG. 5 is a diagram illustrating frame-by-frame passing of visual information, in accordance with an embodiment of the present disclosure.

FIG. 5 is a diagram 500 illustrating frame-by-frame passing of visual information, in accordance with an embodiment of the present disclosure. According to various embodiments of audio generation system 102, the frame-by-frame passing of the visual information is between the CNN of video encoder module 104 and the hierarchical RNN of audio generator module 106. Moreover, in such embodiments, the frame-by-frame passing of the visual information as illustrated in diagram 500 may be performed during both the training phase and the audio generation phase.

As shown in diagram 500, in both the training phase and the audio generation phase, the sequence of video frames of the silent video is provided to the CNN according to a timeline (e.g., a time sequence associated with the sequence of video frames). For example, as shown in diagram 500, a first video frame may be provided to the CNN at a time $t_1$. The CNN can then process the provided first video frame through its convolutional layers to compute the deep features that represent the inferred visual contents of the video frame. The CNN can generate (output) a first FC6 vector, which is provided to the hierarchical RNN. In some embodiments, the first FC6 vector is provided to the coarsest tier of the hierarchical RNN. For example, as illustrated in diagram 500, the first FC6 vector may be combined or concatenated with a node in the coarsest tier of the hierarchical RNN. As described previously, a node in the hierarchical RNN represents audio information, and the node in the coarsest tier may include multiple raw waveform samples. The combined visual information (e.g., the first FC6 vector) and the audio information (e.g., raw waveform samples) in the coarsest tier of the hierarchical RNN guides the generation of the nodes in the lower, finer tiers of the hierarchical RNN, until a raw waveform sample is generated, for example, by a node in the finest tier of the hierarchical RNN. The raw waveform sample generated by a node in the finest tier is the ambient audio inferred by the hierarchical RNN to correspond to the first FC6 vector corresponding to the first video frame provided to the CNN at time $t_1$. At a subsequent time $t_2$ as specified by the timeline, the next video frame (e.g., second video frame) in the sequence of video frames may be provided to the CNN. The CNN can then process the second video frame through its convolutional layers, and generate a second FC6 vector, which is provided to the coarsest tier of the hierarchical RNN. The second FC6 vector is processed through the tiers of the hierarchical RNN until a raw waveform sample that is inferred to correspond to the second FC6 vector is generated by the hierarchical RNN. The subsequent video frames in the sequence of video frames are each processed in like manner according to the timeline (e.g., the third video frame is provided to the CNN at a subsequent time $t_3$ as specified by the timeline, the fourth video frame is provided to the CNN at a subsequent time $t_4$ as specified by the timeline, etc.) until all the video frames in the silent video are processed. Accordingly, in the frame-to-frame passing of the visual information, the hierarchical RNN generates the raw waveform samples for a sequence of video frames one raw waveform sample at a time. That is, the hierarchical RNN generates a first raw waveform sample for the first video frame, generates a second raw waveform sample for the second video frame, and so on.

Figure 6:
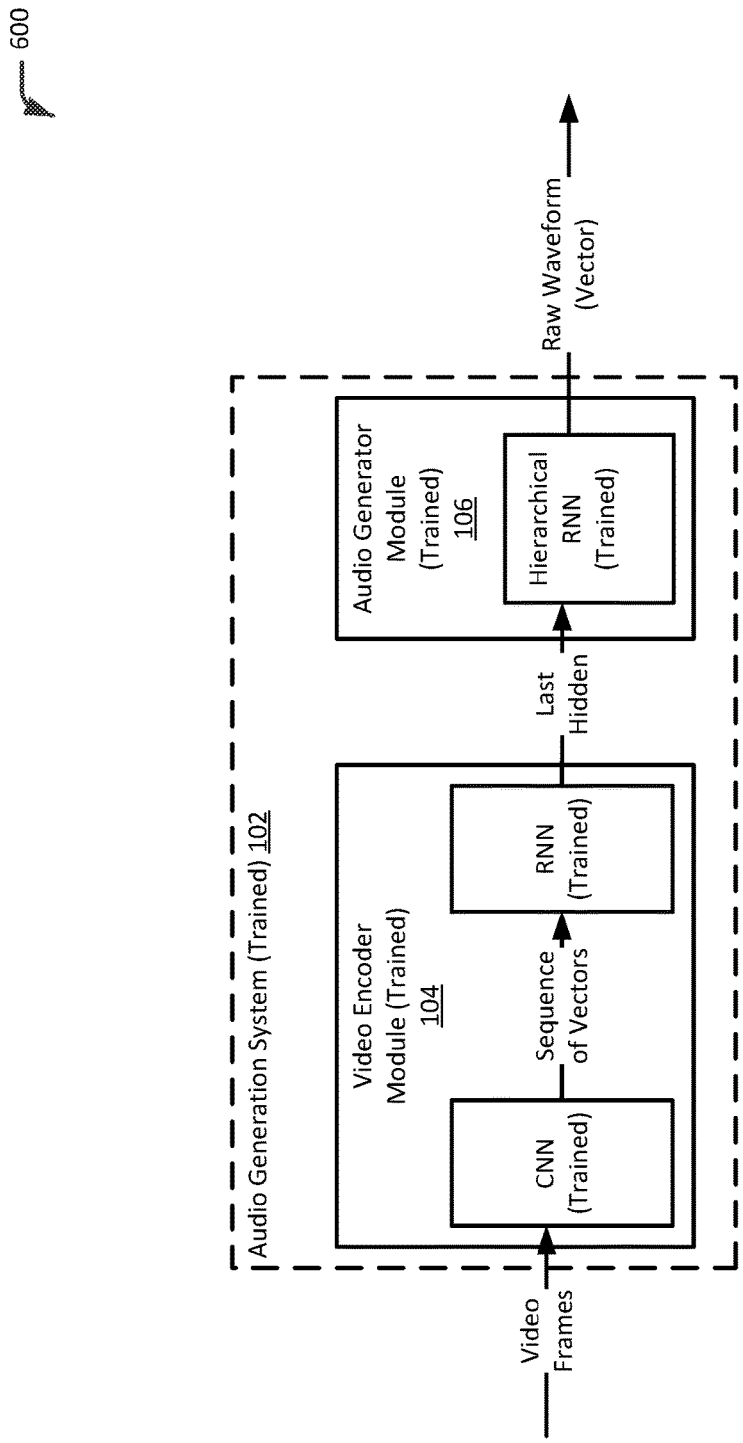
FIG. 6 is a diagram illustrating an example audio generation by a trained audio generation system implementing a sequence-by-sequence passing of visual information, in accordance with an embodiment of the present disclosure.

FIG. 6 is a diagram 600 illustrating an example audio generation by audio generation system 102 implementing a sequence-by-sequence passing of visual information, in accordance with an embodiment of the present disclosure. Diagram 600 of FIG. 6 is similar to diagram 400 of FIG. 4, with additional details. The previously relevant discussion is equally applicable here. Accordingly, unless context dictates otherwise, those components in diagram 600 that are labelled identically to components of diagram 400 will not be described again for the purposes of clarity.

As shown in diagram 600, in the sequence-to-sequence implementation, video encoder module 104 also includes an RNN in addition to the CNN. In such embodiments, the RNN is also trained along with the CNN during a training phase. In one example use case and embodiment of the sequence-by-sequence passing of the visual information in the audio generation phase, a sequence of video frames of a silent video may be input or otherwise provided to the trained CNN, and the trained CNN generates a sequence of vectors, such as FC6 vectors. The sequence of vectors is input or otherwise provided to the trained RNN, which encodes the provided sequence of vectors and generates a last hidden vector. The last hidden vector is a representation of the information provided by the sequence of vectors provided to the trained RNN along a timeline. The trained RNN then provides the last hidden vector to the trained hierarchical RNN of audio generator module 106, which makes an inference as to the ambient audio that corresponds to the visual contents of the sequence of video frames as represented by the provided last hidden vector. The trained hierarchical RNN then generates a raw waveform sample based on the provided last hidden vector (e.g., based on the inferred ambient audio). Thus, for a sequence of video frames, trained RNN generates a single last hidden vector for the provided sequence of vectors, which is provided to the trained hierarchical RNN for generation of a raw waveform sample based on the provided last hidden vector. As an example, suppose the silent video includes a sequence of 60 video frames. In this instance, the trained CNN generates a sequence of 60 vectors, where each vector in the sequence of 60 vectors is a latent representation of the visual contents of a corresponding video frame in the sequence of 60 video frames. The sequence of 60 vectors is provided to the trained RNN. The trained RNN encodes the sequence of 60 vectors and generates a last hidden vector, which is a representation of the information provided by the sequence of vectors along a timeline. The trained RNN provides the last hidden vector to the trained hierarchical RNN of audio generator module 106, which generates a raw waveform sample based on the provided last hidden vector. The raw waveform sample represents the ambient audio that is inferred to correspond to the visual contents of the sequence of 60 video frames as represented by the last hidden vector. Thus, in contrast to the frame-by-frame passing implementation, the trained hierarchical RNN is able to generate a raw waveform sample for a sequence of video frames at one time.

Figure 7:
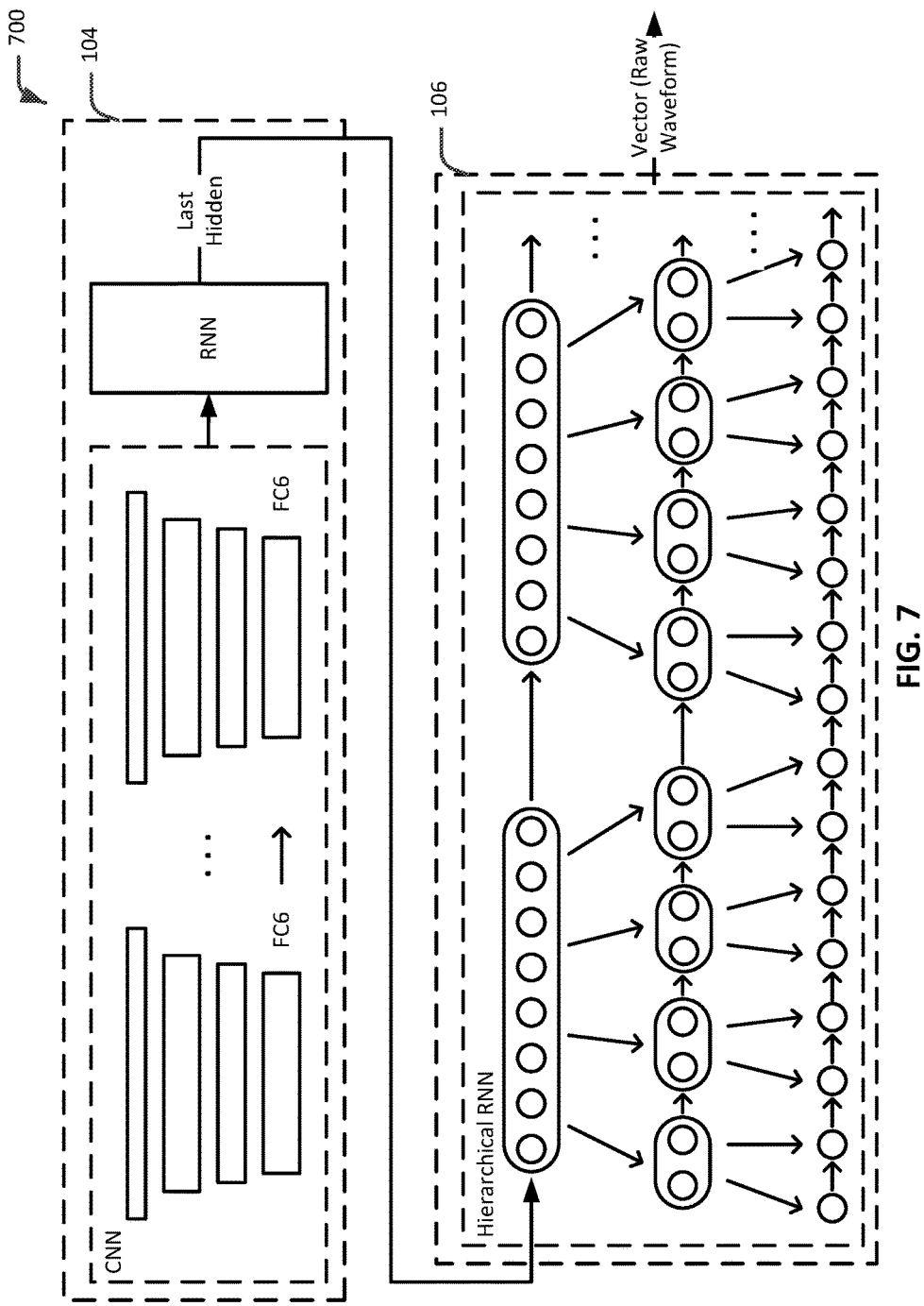
FIG. 7 is a diagram illustrating sequence-by-sequence passing of visual information, in accordance with an embodiment of the present disclosure.

FIG. 7 is a diagram 700 illustrating sequence-by-sequence passing of the visual information, in accordance with an embodiment of the present disclosure. According to various embodiments of audio generation system 102, the sequence-by-sequence passing of the visual information is between the RNN of video encoder module 104 and the hierarchical RNN of audio generator module 106. Moreover, in such embodiments, the sequence-by-sequence passing of the visual information as illustrated in diagram 700 may be performed during both the training phase and the audio generation phase.

As shown in diagram 700, in both the training phase and the audio generation phase, a sequence of FC6 vectors generated by the CNN is provided to the RNN, which generates a last hidden vector that corresponds to the sequence of FC6 vectors provided to the RNN. In some embodiments, the hidden units of the RNN may be of a suitable size, such as 1024 hidden units. The RNN provides the last hidden vector to the hierarchical RNN. In some embodiments, the last hidden vector is used to initialize a hidden vector of the coarsest tier of the hierarchical RNN. The hidden vectors of the lower tiers (e.g., the tiers below the coarsest tier) of the hierarchical RNN are appropriately initialized. As described previously, the coarsest tier of the hierarchical RNN guides the generation of the nodes in the lower, finer tiers of the hierarchical RNN, until a raw waveform sample is generated, for example, by a node in the finest tier of the hierarchical RNN. The raw waveform sample generated by a node in the finest tier is the ambient audio inferred by the hierarchical RNN to correspond to the sequence of video frames as represented by the last hidden vector. Accordingly, in the sequence-to-sequence passing of the visual information, the hierarchical RNN generates the raw waveform sample for a sequence of video frames at one time.

Methodology

Figure 8:
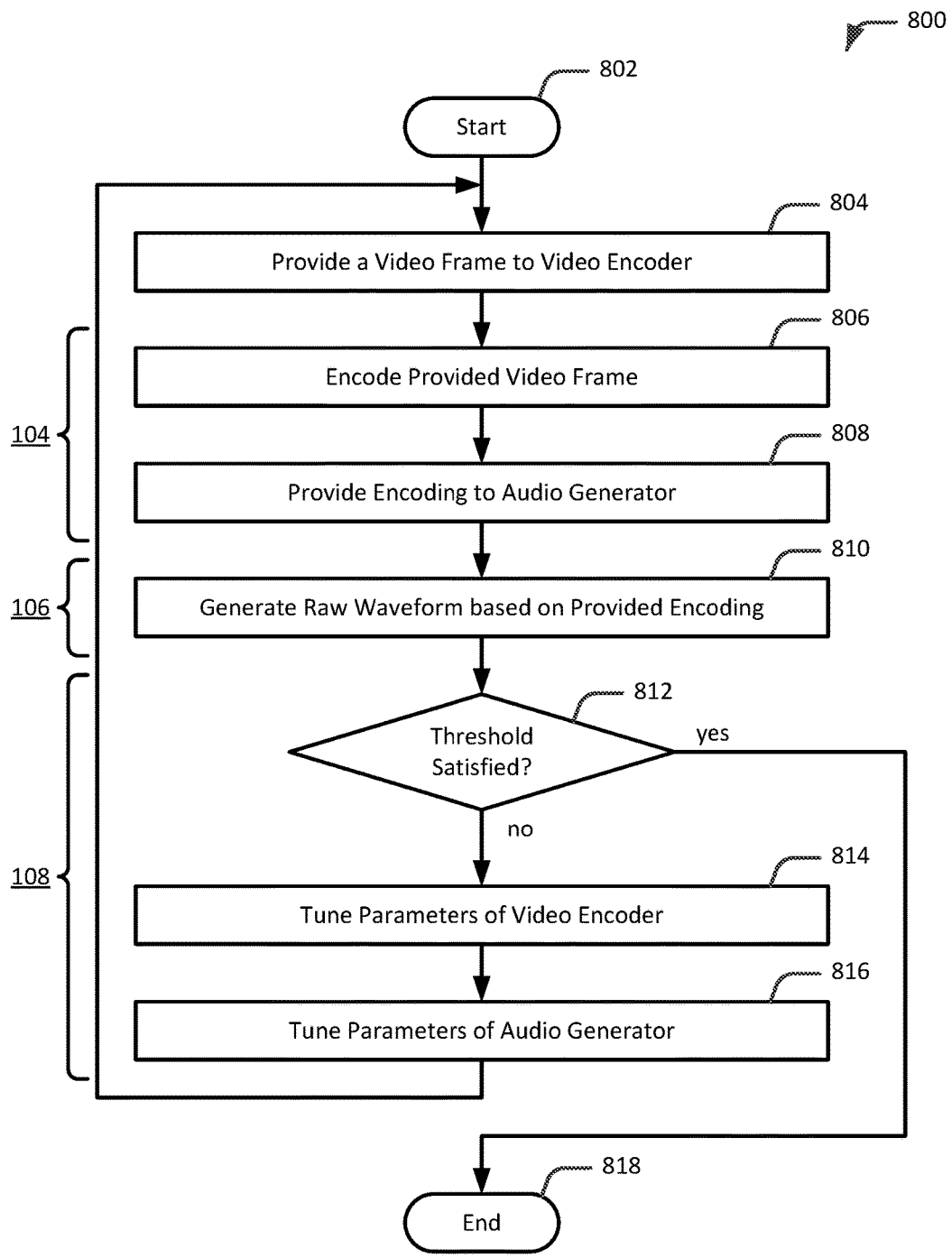
FIG. 8 is a flow diagram illustrating an example process to train an audio generation system implementing a frame-by-frame passing of visual information, in accordance with an embodiment of the present disclosure.
Figure 9:
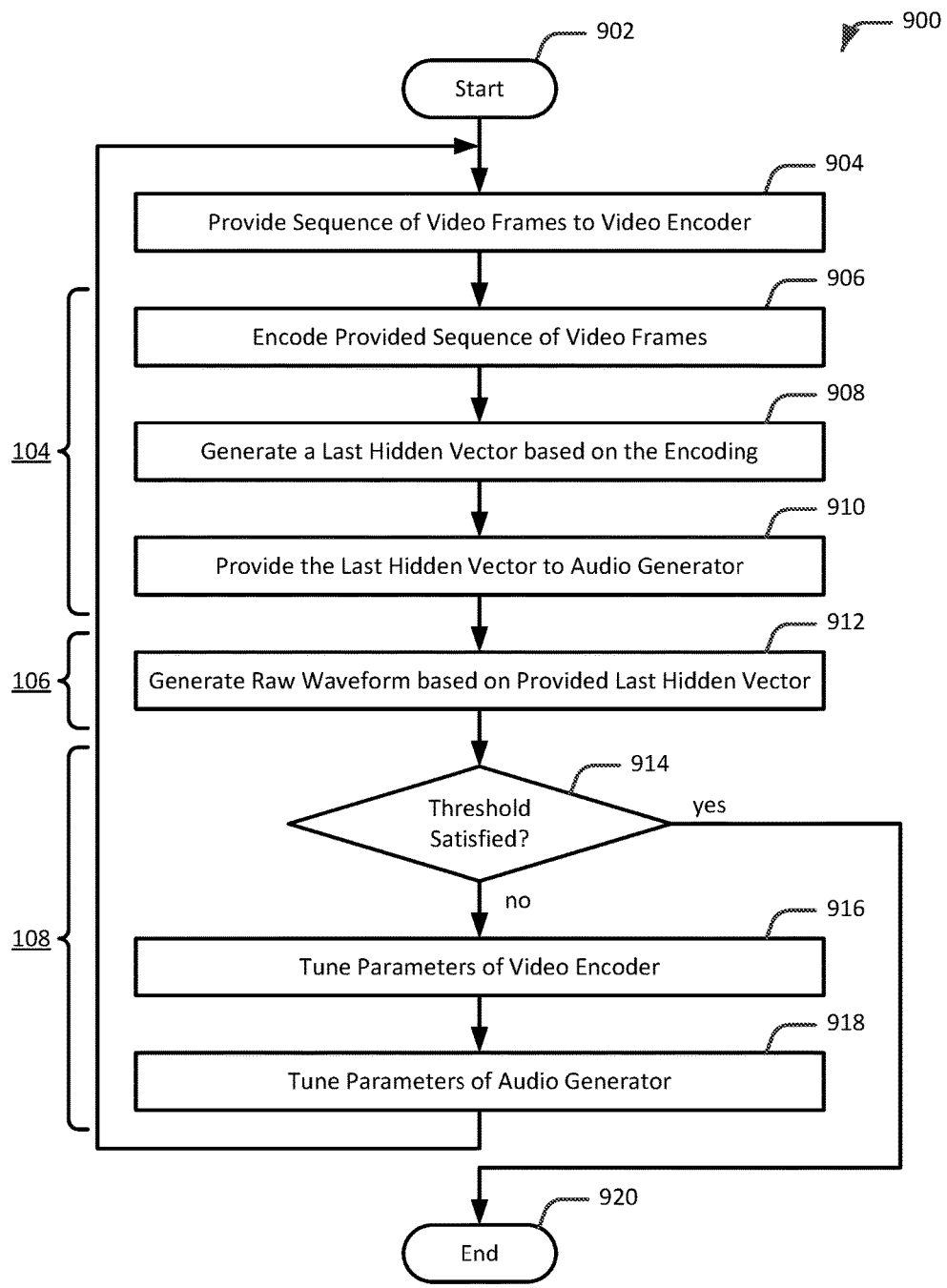
FIG. 9 is a flow diagram illustrating an example process to train an audio generation system implementing a sequence-by-sequence passing of visual information, in accordance with one embodiment of the present disclosure, according to an embodiment.

FIG. 8 is a flow diagram 800 illustrating an example process to train an audio generation system implementing a frame-by-frame passing of visual information, in accordance with an embodiment of the present disclosure. FIG. 9 is a flow diagram 900 illustrating an example process to train an audio generation system implementing a sequence-by-sequence passing of visual information, in accordance with an embodiment of the present disclosure. The operations, functions, or actions illustrated in the example processes of flow diagrams 800 and 900 may in some embodiments be performed by a computing system such as a computing system 1000 of FIG. 10. The operations, functions, or actions described in the respective blocks of the example processes of flow diagrams 800 and 900 may also be stored as computer-executable instructions in a computer-readable medium, such as a memory 1004 and/or a data storage 1006 of computing system 1000. The process may be performed by components of the ambient audio generation framework as variously described herein.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 8, as depicted by flow diagram 800, the process is initiated at block 802. At block 804, a video frame is provided to the video encoder module. For example, the video frame may be a video frame of a sequence of video frames of a silent video. The silent video may be a part of a training set comprised of labeled training data (e.g., video frames and corresponding ground truths). According to some embodiments, the video frame may be provided to the video encoder module along a timeline (e.g., a time sequence associated with the sequence of video frames that includes the video frame).

At block 806, the video encoder module encodes the provided video frame. The encoding may be a latent representation of the visual contents inferred by the video encoder module for the provided video frame. In some embodiments, the latent representation may be a deep feature representation, such as a FC6 representation, of the inferred visual contents. At block 808, the video encoder module provides the encoding to the audio generator module. At block 810, the audio generator module generates a raw waveform sample based on the provided encoding. The raw waveform sample represents ambient audio inferred by the audio generation module to correspond to the visual contents of the video frame as represented by the provided encoding.

At decision block 812, a loss layer module utilizes a suitable loss function to determine whether the difference between the generated raw waveform sample and a corresponding ground truth satisfies an accuracy threshold. The corresponding ground truth is the audio that is separated from the video frame when generating the training set. If the accuracy threshold is satisfied, the process ends at block 818. In this case, the audio generation system is adequately trained to generate ambient audio based on visual information with a high degree of confidence as determined by the accuracy threshold. Conversely, if the accuracy threshold is not satisfied, at block 814, the loss layer module tunes one or more parameters of the video encoder module. At block 816, the loss layer module also tunes one or more parameters of the audio generator module. Accordingly, in some such embodiments, the loss layer module utilizes backpropagation with a suitable learning rate to simultaneously tune the parameters of the video encoder module and the audio generator module based on the measured difference between the generated raw waveform sample and the corresponding ground truth. The process then returns to block 804, and the training process is iterated.

With reference to FIG. 9, as depicted by flow diagram 900, the process is initiated at block 902. At block 904, a sequence of video frames is provided to the video encoder module. For example, the sequence of video frames may be of a silent video. The silent video may be a part of a training set comprised of labeled training data (e.g., sequences of video frames and corresponding ground truths). According to some embodiments, the sequence of video frames may be provided to the video encoder module along a timeline (e.g., a time sequence associated with the sequence of video frames).

At block 906, the video encoder module encodes each video frame of the provided sequence of video frames. The encoding may be a latent representation of the visual contents inferred by the video encoder module for each video frame of the provided sequence of video frames. Accordingly, the video encoder module generates a sequence of latent representations. In some embodiments, each latent representation may be a deep feature representation, such as a FC6 representation, of the inferred visual contents. At block 908, the video encoder module generates a last hidden vector based on the encoding of the sequence of video frames. The generated last hidden vector is a fixed length latent vector that represents the information provided by the encoding of the sequence of video frames along the timeline. At block 910, the video encoder module provides the last hidden vector to the audio generator module. At block 912, the audio generator module generates a raw waveform sample based on the provided last hidden vector. The raw waveform sample represents ambient audio inferred by the audio generation module to correspond to the visual contents of the sequence of video frames as represented by the provided last hidden vector.

At decision block 914, a loss layer module utilizes a suitable loss function to determine whether the difference between the generated raw waveform sample and a corresponding ground truth satisfies an accuracy threshold. The corresponding ground truth is the audio that is separated from the sequence of video frames when generating the training set. If the accuracy threshold is satisfied, the process ends at block 920. In this case, the audio generation system is adequately trained to generate ambient audio based on visual information with a high degree of confidence as determined by the accuracy threshold. Conversely, if the accuracy threshold is not satisfied, at block 916, the loss layer module tunes one or more parameters of the video encoder module. At block 918, the loss layer module also tunes one or more parameters of the audio generator module. Accordingly, in some such embodiments, the loss layer module utilizes backpropagation with a suitable learning rate to simultaneously tune the parameters of the video encoder module and the audio generator module based on the measured difference between the generated raw waveform sample and the corresponding ground truth. The process then returns to block 904, and the training process is iterated.

Figure 10:
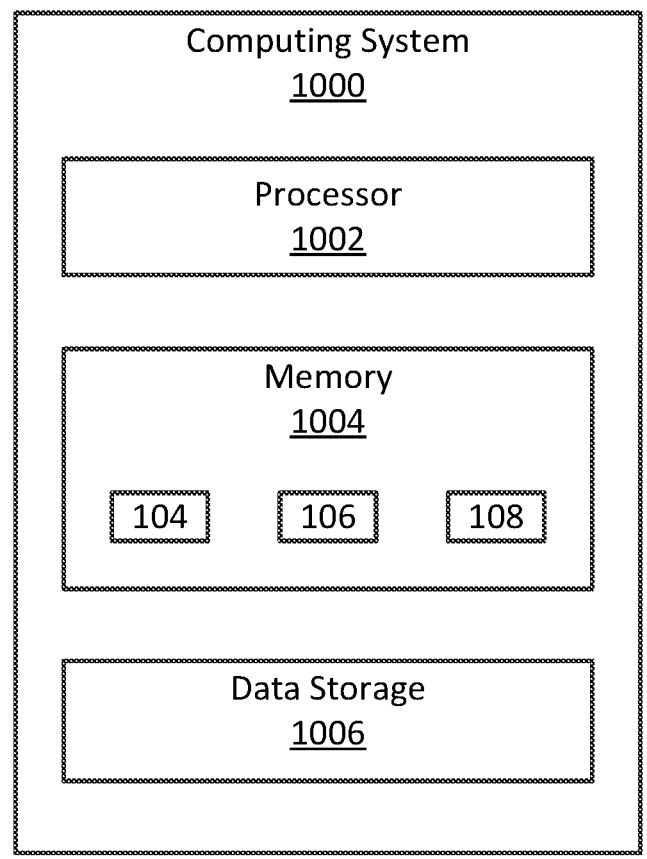
FIG. 10 illustrates selected components of an example computing system that may be used to perform any of the techniques as variously described in the present disclosure.

FIG. 10 illustrates selected components of an example computing system 1000 that may be used to perform any of the techniques as variously described in the present disclosure, according to an embodiment. In some embodiments, computing system 1000 may be configured to implement or direct one or more operations associated with some or all of the engines, components and/or modules associated with ambient audio generation framework and, in particular, audio generation system 102 of FIG. 1. For example, video encoder module 104 (including the CNN and the RNN), audio generator module 106 (including hierarchical RNN), and loss layer module 108, or any combination of these may be implemented in and/or using computing system 1000. In one example case, for instance, each of video encoder module 104, audio generator module 106, and loss layer module 108 is loaded in memory 1004 and executable by processor 1002. Computing system 1000 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 1000 may include processor 1002, memory 1004, and data storage 1006. Processor 1002, memory 1004, and data storage 1006 may be communicatively coupled.

In general, processor 1002 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 1002 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 10, processor 1002 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 1002 may be configured to interpret and/or execute program instructions and/or process data stored in memory 1004, data storage 1006, or memory 1004 and data storage 1006. In some embodiments, processor 1002 may fetch program instructions from data storage 1006 and load the program instructions in memory 1004. After the program instructions are loaded into memory 1004, processor 1002 may execute the program instructions.

For example, in some embodiments, any one or more of the engines, components and/or modules of ambient audio generation framework may be included in data storage 1006 as program instructions. Processor 1002 may fetch some or all of the program instructions from data storage 1006 and may load the fetched program instructions in memory 1004. Subsequent to loading the program instructions into memory 1004, processor 1002 may execute the program instructions such that the computing system may implement the operations as directed by the instructions.

In some embodiments, virtualization may be employed in computing device 1000 so that infrastructure and resources in computing device 1000 may be shared dynamically. For example, a virtual machine may be provided to handle a process running on multiple processors so that the process appears to be using only one computing resource rather than multiple computing resources. Multiple virtual machines may also be used with one processor.

Memory 1004 and data storage 1006 may include computer-readable storage media for carrying or having computer-executable instructions or data structures stored thereon. Such computer-readable storage media may include any available media that may be accessed by a general-purpose or special-purpose computer, such as processor 1002. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 1002 to perform a certain operation or group of operations.

Modifications, additions, or omissions may be made to computing system 1000 without departing from the scope of the present disclosure. For example, in some embodiments, computing system 1000 may include any number of other components that may not be explicitly illustrated or described herein.

As indicated above, the embodiments described in the present disclosure may include the use of a special purpose or a general purpose computer (e.g., processor 1002 of FIG. 10) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 1004 of FIG. 10) for carrying or having computer-executable instructions or data structures stored thereon.

Numerous example variations and configurations will be apparent in light of this disclosure. According to some examples, computer-implemented methods to generate audio based on visual information are described. An example computer-implemented method may include: generating, by a video encoder module that includes a convolutional neural network (CNN), a latent representation of visual contents inferred by the CNN from a video, the video comprising a sequence of video frames; and generating, by a sound generation module that includes a hierarchical recurrent neural network (RNN), a raw waveform sample based on the latent representation of the video, the raw waveform sample representing audio that corresponds to the visual contents as represented by the latent representation, wherein recurrent structure of each tier in the hierarchical RNN allows for the generating to be conditioned on a previously generated audio sample.

In some examples, each video frame of the sequence of video frames is input according to a timeline, and the latent representation is a vector that represents visual contents inferred for an input video frame of the sequence of video frames. In other examples, the vector is a FC6 vector. In still other examples, the vector is concatenated with a respective node in a coarsest tier of the hierarchical RNN of the sound generation module. In yet other examples, the video encoder module includes a recurrent neural network (RNN), and wherein the latent representation of the video is a last hidden vector generated by the RNN of the video encoder module, the last hidden vector being an encoding of a sequence of vectors representing visual contents inferred for the sequence of video frames of the video. In other examples, the last hidden vector initializes a hidden vector in a coarsest tier of the hierarchical RNN of the sound generation module. In still other examples, the hierarchical RNN of the sound generation module is a three tier RNN including a coarsest tier, a middle tier, and a finest tier, wherein each node in the coarsest tier includes X raw waveform samples, each node in the middle tier includes Y raw waveform samples, and each node in the finest tier includes Z raw waveform samples, wherein X is greater than Y, and Y is greater than Z. In still further examples, prior to the generating, the CNN of the video encoder module and the hierarchical RNN of the sound generation module are simultaneously trained during a training phase using multiple backpropagation iterations, each backpropagation iteration of the multiple backpropagation iterations causing a tuning of one or more parameters of the CNN and one or more parameters of the hierarchical RNN.

According to some examples, computer program products including one or more non-transitory machine readable mediums encoded with instructions that when executed by one or more processors cause a process to be carried out to generate audio based on visual information are described. An example process may include: generating, by a convolutional neural network (CNN), a latent representation of visual contents from a video, the video comprising a sequence of video frames; and generating, by a hierarchical recurrent neural network (RNN), a raw waveform sample based on the latent representation of the video, the raw waveform sample representing audio that corresponds to the visual contents as represented by the latent representation, wherein recurrent structure of each tier in the hierarchical RNN allows for the generating to be conditioned on a previously generated audio sample.

In some examples, each video frame of the sequence of video frames is input according to a timeline, and the latent representation is a FC6 vector that represents visual contents inferred for an input video frame of the sequence of video frames. In other examples, the FC6 vector is concatenated with a respective node in a coarsest tier of the hierarchical RNN. In still other examples, the process may also include generating, by a recurrent neural network (RNN), a last hidden vector as the latent representation of the video, the last hidden vector being an encoding of a sequence of FC6 vectors representing visual contents inferred for the sequence of video frames of the video. In yet other examples, the last hidden vector is used to initialize a hidden vector in a coarsest tier of the hierarchical RNN. In other examples, the hierarchical RNN is a three tier RNN including a coarsest tier, a middle tier, and a finest tier, wherein each node in the coarsest tier includes X raw waveform samples, each node in the middle tier includes Y raw waveform samples, and each node in the finest tier includes Z raw waveform samples, wherein X is greater than Y, and Y is greater than Z. In still other examples, prior to the generating by the CNN, the CNN and the hierarchical RNN are simultaneously trained during a training phase using multiple backpropagation iterations, each backpropagation iteration of the multiple backpropagation iterations causing a tuning of one or more parameters of the CNN and one or more parameters of the hierarchical RNN. In yet other examples, the backpropagation utilizes a gradient descent.

According to some examples, systems to generate audio based on visual information are described. An example system may include: one or more processors; a video encoder module at least one of controllable and executable by the one or more processors, the video encoder module including a convolutional neural network (CNN) and configured to generate a latent representation of visual contents inferred by the CNN from a video, the video comprising a sequence of video frames; and a sound generation module at least one of controllable and executable by the one or more processors, the sound generation module including a hierarchical recurrent neural network (RNN) and configured to generate a raw waveform sample based on the latent representation of the video, the raw waveform sample representing audio that corresponds to the visual contents as represented by the latent representation, wherein recurrent structure of each tier in the recurrent hierarchical RNN allows for the generating to be conditioned on a previously generated audio sample.

In some examples, the latent representation is a sequence of vectors, each vector of the sequence of vectors representing visual contents inferred for a respective video frame of the sequence of video frames of the video, and further wherein each vector of the sequence of vectors is concatenated with a respective node in a coarsest tier of the trained RNN along a timeline. In other examples, the latent representation is a last hidden vector generated by a RNN of the video encoder module, the last hidden vector being an encoding of a sequence of vectors representing visual contents inferred for the sequence of video frames of the video, and further wherein the last hidden vector is used to initialize a hidden vector in a coarsest tier of the hierarchical RNN of the sound generation module. In still other examples, the hierarchical RNN of the sound generation module is a three tier RNN including a coarsest tier, a middle tier, and a finest tier.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to generate audio based on visual information, the method comprising:
    generating, by a video encoder module that includes a convolutional neural network (CNN), a latent representation of visual contents inferred by the CNN from a video, the video comprising a sequence of video frames; and
    generating, by a sound generation module that includes a hierarchical recurrent neural network (RNN), a raw waveform sample based on the latent representation of the video, the raw waveform sample representing audio that corresponds to the visual contents as represented by the latent representation, wherein recurrent structure of each tier in the hierarchical RNN allows for the generating to be conditioned on a previously generated audio sample.

2. The method of claim 1, wherein each video frame of the sequence of video frames is input according to a timeline, and wherein the latent representation is a vector that represents visual contents inferred for an input video frame of the sequence of video frames.

3. The method of claim 2, wherein the vector is a FC6 vector.

4. The method of claim 2, wherein the vector is concatenated with a respective node in a coarsest tier of the hierarchical RNN of the sound generation module.

5. The method of claim 1, wherein the video encoder module includes a recurrent neural network (RNN), and wherein the latent representation of the video is a last hidden vector generated by the RNN of the video encoder module, the last hidden vector being an encoding of a sequence of vectors representing visual contents inferred for the sequence of video frames of the video.

6. The method of claim 5, wherein the last hidden vector initializes a hidden vector in a coarsest tier of the hierarchical RNN of the sound generation module.

7. The method of claim 1, wherein the hierarchical RNN of the sound generation module is a three tier RNN comprising a coarsest tier, a middle tier, and a finest tier, wherein each node in the coarsest tier includes X raw waveform samples, each node in the middle tier includes Y raw waveform samples, and each node in the finest tier includes Z raw waveform samples, wherein X is greater than Y, and Y is greater than Z.

8. The method of claim 1, wherein prior to the generating, the CNN of the video encoder module and the hierarchical RNN of the sound generation module are simultaneously trained during a training phase using a plurality of backpropagation iterations, each backpropagation iteration of the plurality of backpropagation iterations causing a tuning of one or more parameters of the CNN and one or more parameters of the hierarchical RNN.

9. A computer program product including one or more non-transitory machine readable mediums encoded with instruction that when executed by one or more processors cause a process to be carried out to generate audio based on visual information, the process comprising:
    generating, by a convolutional neural network (CNN), a latent representation of visual contents from a video, the video comprising a sequence of video frames; and
    generating, by a hierarchical recurrent neural network (RNN), a raw waveform sample based on the latent representation of the video, the raw waveform sample representing audio that corresponds to the visual contents as represented by the latent representation, wherein recurrent structure of each tier in the hierarchical RNN allows for the generating to be conditioned on a previously generated audio sample.

10. The computer program product of claim 9, wherein each video frame of the sequence of video frames is input according to a timeline, and wherein the latent representation is a FC6 vector that represents visual contents inferred for an input video frame of the sequence of video frames.

11. The computer program product of claim 10, wherein the FC6 vector is concatenated with a respective node in a coarsest tier of the hierarchical RNN.

12. The computer program product of claim 9, wherein the process further comprising generating, by a recurrent neural network (RNN), a last hidden vector as the latent representation of the video, the last hidden vector being an encoding of a sequence of FC6 vectors representing visual contents inferred for the sequence of video frames of the video.

13. The computer program product of claim 12, wherein the last hidden vector is used to initialize a hidden vector in a coarsest tier of the hierarchical RNN.

14. The computer program product of claim 9, wherein the hierarchical RNN is a three tier RNN comprising a coarsest tier, a middle tier, and a finest tier, wherein each node in the coarsest tier includes X raw waveform samples, each node in the middle tier includes Y raw waveform samples, and each node in the finest tier includes Z raw waveform samples, wherein X is greater than Y, and Y is greater than Z.

15. The computer program product of claim 9, wherein prior to the generating by the CNN, the CNN and the hierarchical RNN are simultaneously trained during a training phase using a plurality of backpropagation iterations, each backpropagation iteration of the plurality of backpropagation iterations causing a tuning of one or more parameters of the CNN and one or more parameters of the hierarchical RNN.

16. The computer program product of claim 15, wherein the backpropagation utilizes a gradient descent.

17. A system to generate audio based on visual information, the system comprising:
    one or more processors;
    a video encoder module at least one of controllable and executable by the one or more processors, the video encoder module including a convolutional neural network (CNN) and configured to generate a latent representation of visual contents inferred by the CNN from a video, the video comprising a sequence of video frames; and
    a sound generation module at least one of controllable and executable by the one or more processors, the sound generation module including a hierarchical recurrent neural network (RNN) and configured to generate a raw waveform sample based on the latent representation of the video, the raw waveform sample representing audio that corresponds to the visual contents as represented by the latent representation, wherein recurrent structure of each tier in the recurrent hierarchical RNN allows for the generating to be conditioned on a previously generated audio sample.

18. The system of claim 17, wherein the latent representation is a sequence of vectors, each vector of the sequence of vectors representing visual contents inferred for a respective video frame of the sequence of video frames of the video, and further wherein each vector of the sequence of vectors is concatenated with a respective node in a coarsest tier of the trained RNN along a timeline.

19. The system of claim 17, wherein the latent representation is a last hidden vector generated by a RNN of the video encoder module, the last hidden vector being an encoding of a sequence of vectors representing visual contents inferred for the sequence of video frames of the video, and further wherein the last hidden vector is used to initialize a hidden vector in a coarsest tier of the hierarchical RNN of the sound generation module.

20. The system of claim 17, wherein the hierarchical RNN of the sound generation module is a three tier RNN comprising a coarsest tier, a middle tier, and a finest tier.

* * * * *